(12) United States Patent
Dougherty et al.

(10) Patent No.: US 8,098,605 B2
(45) Date of Patent: Jan. 17, 2012

(54) SYSTEM AND METHOD FOR DYNAMIC DISTRIBUTED COMMUNICATION

(75) Inventors: Angus O. Dougherty, Westminster, CO (US); Donald L. Hohnstein, Greeley, CO (US); Charles I. Cook, Louisville, CO (US); Guy M. Wells, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 56 days.

(21) Appl. No.: 12/199,267

(22) Filed: Aug. 27, 2008

(65) Prior Publication Data

US 2008/0317043 A1 Dec. 25, 2008

Related U.S. Application Data

(60) Continuation of application No. 10/847,787, filed on May 18, 2004, now Pat. No. 7,561,540, which is a division of application No. 09/603,035, filed on Jun. 23, 2000, now Pat. No. 6,987,769.

(60) Provisional application No. 60/152,730, filed on Sep. 8, 1999, provisional application No. 60/185,788, filed on Feb. 29, 2000.

(51) Int. Cl.
*H04B 7/00* (2006.01)
(52) U.S. Cl. ............... 370/310.2; 370/400; 370/401; 370/338; 370/395.3
(58) Field of Classification Search .......... 370/229, 370/230, 235, 310, 310.1, 310.2, 328, 349, 370/352, 395.1, 395.2
See application file for complete search history.

(56) References Cited

U.S. PATENT DOCUMENTS

| | | | |
|---|---|---|---|
| 4,317,229 A | 2/1982 | Craig et al. |
| 4,881,082 A | 11/1989 | Graziano |
| 4,930,118 A | 5/1990 | Sugihara |
| 5,068,916 A | 11/1991 | Harrison et al. |
| 5,150,473 A | 9/1992 | Zulch |
| 5,195,016 A | 3/1993 | Powers |
| 5,257,257 A | 10/1993 | Chen et al. |
| 5,315,584 A | 5/1994 | Savary et al. |
| 5,339,316 A | 8/1994 | Diepstraten |
| 5,341,395 A | 8/1994 | Bi |
| 5,353,300 A | 10/1994 | Lee et al. |
| 5,390,170 A | 2/1995 | Sawant et al. |

(Continued)

FOREIGN PATENT DOCUMENTS

WO 9729605 1/1997

(Continued)

OTHER PUBLICATIONS

U.S. Appl. No. 09/603,035, Office Action dated Oct. 31, 2003, 4 pages.

(Continued)

*Primary Examiner* — Kwang B Yao
*Assistant Examiner* — Nguyen Ngo (57) ABSTRACT

Growth of a distributed communication system is facilitated through dynamic addition of routing elements. A new routing element may be added to a network of routing elements by first establishing a connection between the new routing element and an existing routing element in the network. The connection may be either wireless or wireline. At least one address is assigned to the new routing element. Each assigned address comes from a pool of addresses maintained at the existing routing element. At least one pool of addresses is issued to the new routing element, permitting the new routing element to dynamically add yet another new routing element to the network of routing elements.

14 Claims, 7 Drawing Sheets

U.S. PATENT DOCUMENTS

| | | | |
|---|---|---|---|
| 5,400,040 A | 3/1995 | Lane et al. | |
| 5,406,550 A | 4/1995 | McTiffin | |
| 5,408,237 A | 4/1995 | Patterson et al. | |
| 5,410,568 A | 4/1995 | Schilling | |
| 5,461,610 A | 10/1995 | Weerackody | |
| 5,473,602 A | 12/1995 | McKenna et al. | |
| 5,479,400 A | 12/1995 | Dilworth et al. | |
| 5,504,744 A | 4/1996 | Adams et al. | |
| 5,504,746 A * | 4/1996 | Meier | 370/401 |
| 5,513,183 A | 4/1996 | Kay et al. | |
| 5,517,504 A | 5/1996 | Tran et al. | |
| 5,517,617 A | 5/1996 | Sathaye et al. | |
| 5,519,706 A | 5/1996 | Bantz et al. | |
| 5,526,376 A | 6/1996 | Kellenberger | |
| 5,563,892 A | 10/1996 | Kostreski et al. | |
| 5,566,165 A | 10/1996 | Sawahashi et al. | |
| 5,572,528 A | 11/1996 | Shuen | |
| 5,590,133 A | 12/1996 | Billstrom et al. | |
| 5,617,540 A * | 4/1997 | Civanlar et al. | 370/395.54 |
| 5,640,414 A | 6/1997 | Blakeney, II et al. | |
| 5,641,141 A | 6/1997 | Goodwin | |
| 5,646,635 A | 7/1997 | Cockson et al. | |
| 5,673,263 A | 9/1997 | Basso et al. | |
| 5,673,264 A | 9/1997 | Hamaguchi | |
| 5,708,659 A | 1/1998 | Rostoker et al. | |
| 5,715,250 A | 2/1998 | Watanabe | |
| 5,726,984 A | 3/1998 | Kubler et al. | |
| 5,729,549 A | 3/1998 | Kostreski et al. | |
| 5,737,328 A | 4/1998 | Norman et al. | |
| 5,737,333 A | 4/1998 | Civanlar et al. | |
| 5,761,195 A | 6/1998 | Lu et al. | |
| 5,764,645 A | 6/1998 | Bernet et al. | |
| 5,793,758 A | 8/1998 | Penners | |
| 5,805,996 A | 9/1998 | Salmela | |
| 5,809,415 A | 9/1998 | Rossmann | |
| 5,815,809 A | 9/1998 | Ward et al. | |
| 5,819,182 A | 10/1998 | Gardner et al. | |
| 5,825,759 A | 10/1998 | Liu | |
| 5,828,844 A | 10/1998 | Civanlar et al. | |
| 5,872,588 A | 2/1999 | Aras et al. | |
| 5,886,738 A | 3/1999 | Hollenbeck et al. | |
| 5,889,770 A | 3/1999 | Jokiaho et al. | |
| 5,890,055 A | 3/1999 | Chu et al. | |
| 5,894,478 A | 4/1999 | Barzegar et al. | |
| 5,896,369 A | 4/1999 | Warsta et al. | |
| 5,898,904 A | 4/1999 | Wang | |
| 5,901,356 A | 5/1999 | Hudson | |
| 5,903,559 A | 5/1999 | Acharya et al. | |
| 5,907,555 A | 5/1999 | Raith | |
| 5,907,816 A | 5/1999 | Newman et al. | |
| 5,909,430 A | 6/1999 | Reaves | |
| 5,930,247 A | 7/1999 | Miller, II et al. | |
| 5,935,209 A | 8/1999 | Budhraja et al. | |
| 5,936,754 A | 8/1999 | Ariyavisitakul | |
| 5,943,321 A | 8/1999 | St-Hilaire et al. | |
| 5,958,018 A | 9/1999 | Eng et al. | |
| 5,963,178 A | 10/1999 | Jones | |
| 5,970,406 A | 10/1999 | Komara | |
| 5,970,410 A | 10/1999 | Carney et al. | |
| 5,978,650 A | 11/1999 | Fischer et al. | |
| 6,006,096 A | 12/1999 | Trompower | |
| 6,009,096 A | 12/1999 | Jaisingh et al. | |
| 6,009,097 A | 12/1999 | Han | |
| 6,021,263 A | 2/2000 | Kujoory et al. | |
| 6,046,978 A | 4/2000 | Melnik | |
| 6,047,006 A | 4/2000 | Brakefield et al. | |
| 6,049,533 A | 4/2000 | Norman et al. | |
| 6,052,744 A | 4/2000 | Moriarty et al. | |
| 6,061,579 A | 5/2000 | Arai et al. | |
| 6,069,592 A | 5/2000 | Wass | |
| 6,070,187 A | 5/2000 | Subramaniam et al. | |
| 6,078,787 A | 6/2000 | Schefte | |
| 6,091,788 A | 7/2000 | Keskitalo et al. | |
| 6,094,424 A | 7/2000 | Kalmanek et al. | |
| 6,100,849 A | 8/2000 | Tsubaki et al. | |
| 6,108,314 A | 8/2000 | Jones et al. | |
| 6,128,512 A | 10/2000 | Trompower et al. | |
| 6,132,306 A | 10/2000 | Trompower | |
| 6,141,341 A | 10/2000 | Jones et al. | |
| 6,141,565 A | 10/2000 | Feuerstein et al. | |
| 6,175,747 B1 | 1/2001 | Tanishima et al. | |
| 6,219,563 B1 | 4/2001 | Pillekamp et al. | |
| 6,240,074 B1 | 5/2001 | Chandos et al. | |
| 6,243,585 B1 | 6/2001 | Pelech et al. | |
| 6,289,017 B1 | 9/2001 | Shani et al. | |
| 6,301,238 B1 | 10/2001 | Hagerman et al. | |
| 6,324,577 B1 | 11/2001 | Hirai | |
| 6,330,244 B1 | 12/2001 | Swartz et al. | |
| 6,351,237 B1 | 2/2002 | Martek et al. | |
| 6,359,901 B1 | 3/2002 | Todd et al. | |
| 6,363,070 B1 | 3/2002 | Mullens et al. | |
| 6,370,185 B1 | 4/2002 | Schmutz et al. | |
| 6,381,473 B1 | 4/2002 | Niki | |
| 6,405,049 B2 | 6/2002 | Herrod et al. | |
| 6,421,731 B1 | 7/2002 | Ciotti, Jr. et al. | |
| 6,445,926 B1 * | 9/2002 | Boch et al. | 455/447 |
| 6,487,457 B1 | 11/2002 | Hull et al. | |
| 6,496,511 B1 * | 12/2002 | Wang et al. | 370/401 |
| 6,505,255 B1 | 1/2003 | Akatsu et al. | |
| 6,510,152 B1 | 1/2003 | Gerszberg et al. | |
| 6,512,756 B1 | 1/2003 | Mustajarvi et al. | |
| 6,522,641 B1 * | 2/2003 | Siu et al. | 370/338 |
| 6,526,581 B1 | 2/2003 | Edson | |
| 6,542,117 B1 | 4/2003 | Broughton | |
| 6,560,234 B1 | 5/2003 | Ben-Michael et al. | |
| 6,563,827 B1 | 5/2003 | Brueckheimer et al. | |
| 6,564,060 B1 | 5/2003 | Hoagland | |
| 6,571,286 B2 | 5/2003 | Fisher et al. | |
| 6,577,643 B1 | 6/2003 | Rai et al. | |
| 6,584,080 B1 * | 6/2003 | Ganz et al. | 370/315 |
| 6,584,096 B1 | 6/2003 | Allan | |
| 6,587,457 B1 * | 7/2003 | Mikkonen | 370/356 |
| 6,587,468 B1 | 7/2003 | Dos Santos et al. | |
| 6,600,734 B1 | 7/2003 | Gernert et al. | |
| 6,628,627 B1 | 9/2003 | Zendle et al. | |
| 6,653,933 B2 | 11/2003 | Raschke et al. | |
| 6,725,047 B1 | 4/2004 | Farley et al. | |
| 6,738,637 B1 | 5/2004 | Marinho et al. | |
| 6,757,268 B1 | 6/2004 | Zendle | |
| 6,765,918 B1 | 7/2004 | Dixon et al. | |
| 6,795,863 B1 | 9/2004 | Doty, Jr. | |
| 6,850,512 B1 | 2/2005 | Bishop et al. | |
| 6,853,637 B1 | 2/2005 | Norrell et al. | |
| 6,888,803 B1 * | 5/2005 | Gentry et al. | 370/401 |
| 6,987,769 B1 * | 1/2006 | Dougherty et al. | 370/401 |
| 7,089,009 B1 * | 8/2006 | Fauconnier | 455/445 |
| 7,190,686 B1 * | 3/2007 | Beals | 370/337 |
| 7,561,540 B2 | 7/2009 | Dougherty et al. | |
| 7,561,895 B1 * | 7/2009 | Hohnstein et al. | 455/524 |
| 2001/0043926 A1 * | 11/2001 | Chapman et al. | 370/401 |
| 2002/0013847 A1 * | 1/2002 | Fisher et al. | 709/226 |
| 2002/0037004 A1 | 3/2002 | Bossemeyer et al. | |
| 2002/0181485 A1 | 12/2002 | Cao et al. | |
| 2003/0144018 A1 | 7/2003 | Minnick et al. | |
| 2004/0076160 A1 * | 4/2004 | Phaltankar | 370/395.1 |
| 2005/0262241 A1 * | 11/2005 | Gubbi et al. | 709/225 |

FOREIGN PATENT DOCUMENTS

| | | |
|---|---|---|
| WO | 9736405 | 3/1997 |
| WO | 9748210 | 6/1997 |
| WO | 9826548 | 6/1997 |
| WO | 9809440 | 9/1997 |

OTHER PUBLICATIONS

U.S. Appl. No. 09/603,035, Notice of Allowance dated Mar. 30, 2004, 9 pgs.

U.S. Appl. No. 6,987,769 B1, dated Jan. 17, 2006, 17 pgs.

U.S. Appl. No. 10/847,787, Notice of Allowance dated Aug. 26, 2008, 26 pgs.

U.S. Appl. No. 10/847,787, Notice of Allowability dated Mar. 6, 2009, 16 pgs.

U.S. Appl. No. 7,561,540 B2, dated Jul. 14, 2009, 18 pgs.

* cited by examiner

SYSTEM AND METHOD FOR DYNAMIC DISTRIBUTED COMMUNICATION

CROSS-REFERENCE TO RELATED APPLICATIONS

This application is a continuation of application Ser. No. 10/847,787, filed May 18, 2004, which is a divisional of application Ser. No. 09/603,035, filed Jun. 23, 2000, which claims the benefit of U.S. Provisional Application No. 60/152,730, filed Sep. 8, 1999 and U.S. Provisional Application No. 60/185,788, filed Feb. 29, 2000. The specification of each of Application Nos. 60/152,730 and 60/185,788 is expressly incorporated herein by reference in its entirety.

TECHNICAL FIELD

The present invention relates to dynamically modifying communication network components.

BACKGROUND ART

Communication systems are increasingly being required to provide a wide range of services, including different forms of information communicated and different communication characteristics. Information forms include voice, data, video, telemetry, and the like. Communication characteristics include quality, complexity, latency, reliability, cost, availability, portability, and the like. Infrastructure such as telecommunication systems, the Internet, and cable systems exist to provide long-haul routing and information content sourcing. However, difficulty remains in delivering this information to customers. This is particularly the case if the customer is located in a rural location, is communicating through portable equipment, or is mobile.

Traditionally, communication service providers have relied on copper wire or coaxial cable to connect distribution sites and subscriber premises. However, increases in the number of users, number and type of communication devices per user, and the information rate per device has strained the ability for traditional communication systems to provide the necessary bandwidth and flexibility. Various technologies including digital subscriber line (DSL) and video modems offer broadband access to the subscriber over existing copper or coaxial loop technologies. Fiber-to-the-home offers broadband access through additional wireline connections. While each technology has broadband delivery properties, each is subject to physical and signaling limitations that restrict availability in certain locations and for certain applications. For example, VDSL is limited to within approximately one kilometer of a connecting central office. Further, each central office usually cannot support high-speed access for every customer within the central office coverage area. Similarly, service provided by two-way cable modems is limited to the installation of coax, hybrid fiber coax and fiber-based systems by the cable provider as well as support capabilities of the supporting central office. Currently, many premises do not have access to high-speed wireline voice, data, and video services due, in part, to the expense and difficulty in constructing or expanding central offices.

Wireless systems, such as PCS and cellular systems, offer an alternative to wireline services. Typically, wireless systems include a centralized mobile switching center (MSC) responsible for routing calls, tracking user locations, billing information, and connectivity with other communication systems. The MSC is connected to base station controllers (BSCs), each of which supports one or more base transceiver stations (BTSs). Each BTS supports one or more cells based on the number and configuration of antennas supported by the BTS. Customers communicate with the wireless system through radio telephones when the telephone is within the coverage range of a cell. When a call is placed, a circuit-switched connection is established from the telephone, through the BTS and BSC, to the MSC. The MSC determines the destination and, if the destination is to another telephone within the wireless system, establishes a circuit-switched connection to the destination telephone. If the destination is outside of the wireless system, the MSC routes the call to a service provider for the outside destination.

Cellular and PCS wireless systems have traditionally focused on voice. However, recent introduction of digital radio in both the 800 MHz and 1.9 GHz permits low-speed data services, such as text messaging and one-way paging, to be implemented. Also, wireless modems implementing wireless application protocols may be incorporated into hand-held devices such as lap top personal computers and personal digital assistants (PDAs). Such devices may offer access to the Internet at rates up to 19.2 kilobits per second.

Several problems have developed with traditional wireless systems. First, because all calls are processed by the central MSC, it can become a bottleneck limiting the number of users supported. Second, if the MSC fails, the system becomes inoperative. Third, the BSC and BTS architecture is fairly rigid, requiring manual reconfiguration in the MSC when components are added or deleted. Fourth, circuit-switched channel connections establish an upper bandwidth, limiting communication rates. Fifth, bandwidth is wasted if the communication rate does not reach the maximum established by the communication channel. Sixth, high-speed data and video applications are impractical on wireless telecommunication systems designed primarily for voice.

An alternative wireless communication system is the multi-channel multipoint distribution system (MMDS). In MMDS, an antenna broadcasts high-bandwidth content to local receiving antennas. In the case of Internet access, the return path is typically through slow telephone lines. MMDS, like wireline cable systems, is asymmetrical, making it best suited for distribution of one-way entertainment signals such as television. MMDS also typically operates at a higher carrier frequency than PCS systems, requiring receiving antennas to be positioned in line-of-site with the transmitting antenna. MMDS is typically deployed in a single cell broadcast architecture. Other wireless communication systems, such as local multipoint distribution system (LMDS) may be deployed in a cellular fashion. However, because these systems typically operate at a high carrier frequency, receiving antennas must be positioned in line-of-sight with the transmitting antenna.

What is needed is a communication system that provides voice, data, and video signals at rates appropriate for each user. The system should make efficient use of bandwidth, allocating only the bandwidth necessary for a particular communication. The system should be flexible, permitting automatic addition and deletion of network components. The system should have distributed routing and service provisioning to prevent bottlenecks, permit scaling, and increase reliability and robustness. The system should support wireless subscriber units, accommodating a wide variety of fixed, portable, and mobile user communication devices. The system should support high-speed symmetric communication for applications such as video conferencing, real-time distributed document sharing, and the like.

DISCLOSURE OF INVENTION

The present invention provides automatic and dynamic addition of network routing elements to a distributed communication network. This permits rapid, scalable, and inexpensive growth of the communication network, allowing for a flexible system that can be easily modified to meet customer needs, balance resources, and satisfy physical constraints and government regulations.

A new routing element may be dynamically added to a network of routing elements by first establishing a connection between the new routing element and an existing routing element in the network. The connection may be either wireless or wireline. At least one address is assigned to the new routing element. Each assigned address comes from a pool of addresses maintained at the existing routing element. At least one pool of addresses is issued to the new routing element, permitting the new routing element to dynamically add yet another new routing element to the network of routing elements.

The assigned address may be one or more from a set including an ATM address and an IP address. Likewise, address pools may be pools of ATM addresses and pools of IP addresses. Other types of addresses may be included or substituted, such as TCP, 802.x, and the like. Any assignable address that can distinguish between network elements may be used.

Routing elements may be of a variety of types. Any routing element that receives or forwards information packets may be used. For example, routing elements may include distribution points and access points in a communication network. In one aspect of the present invention, distribution points form peer-to-peer relationships with each other. Access points form client-server relationships with distribution points. If multiple addresses are assigned to each routing element, relationships between routing elements may be established concurrently across more than one layers. For example, IP routing may be established at the network layer and ATM switching at the data link layer with routing elements communicating in a peer-to-peer or client-server relationship at each layer.

Communications networks can now support dynamic addition of routing elements. In one embodiment, a supervisor supplies pools of ATM end user addresses and pools of IP addresses. Access points transmit packets to and receive packets from at least one subscriber unit. Distribution points and access points form the network, with each distribution point communicating with at least one other distribution point and with each access point communicating with at least one distribution point. Each distribution point obtains a pool of ATM end user addresses and a pool of IP addresses from the supervisor. When a distribution point receives a request from a new network element to join the network, the distribution point provides the new network element with an ATM end user address from the pool of ATM end user addresses and an IP address from the pool of IP addresses. An access point may also receive address pools and function as a distribution point in support of additional access points.

Dynamic distributed communication networks may also concurrently support many types of information traffic. For example, packetized voice information may be transferred between network elements at the data link layer while data packets are transferred between network elements at the network layer. Packets may be routed through the communication network based on the forward equivalency class holding the packet destination address or similar information.

The above objects and features as well as other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
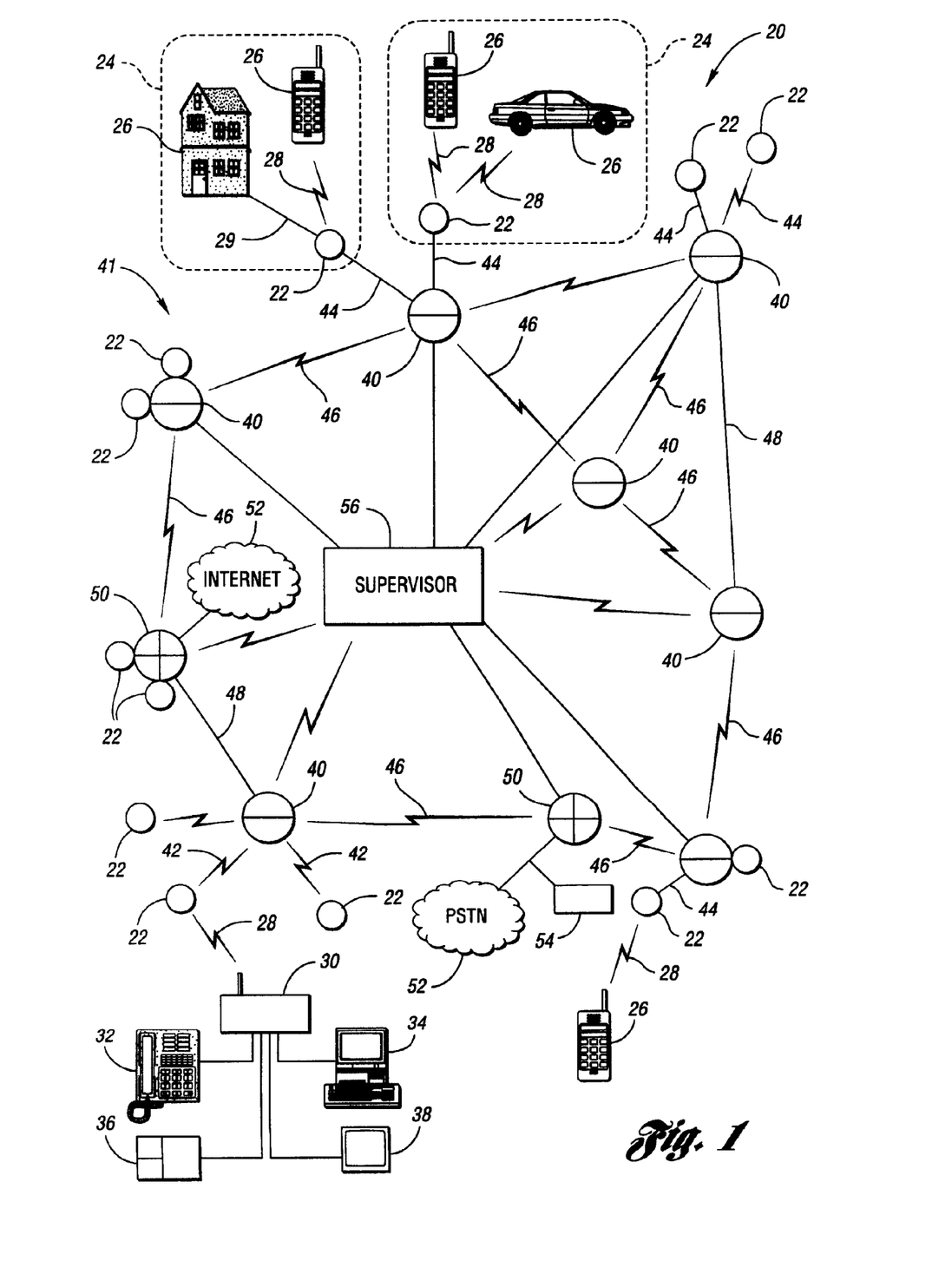
FIG. 1 is a schematic drawing illustrating a portion of a communication system according to an embodiment of the present invention.

Referring to FIG. 1, a schematic drawing illustrating a portion of a communication system according to an embodiment of the present invention is shown. A communication system, shown generally by 20, includes a plurality of access points 22 which may be, for example, a local radio access point (LRAP). Each access point 22 defines coverage area 24 such as, for example, a cell, covering a reception range of access point 22. Coverage area 24 may be formed from many independent sectors, as may result if access point 22 uses many unidirectional antennas, or may be a single region resulting from the use of an omnidirectional antenna. Subscriber unit 26 within coverage area 24 may establish two-way wireless link 28 with access point 22. Subscriber unit 26 may also establish wireline link 29 with access point 22. Links 28, 29 may be symmetrical or asymmetrical. Subscriber unit 26 may be fixed or non-fixed and, if non-fixed, may posses varying degrees of portability and mobility. Subscriber unit 26 may be a mobile telephone, a computer, a video receiver, an audio receiver, a two-way video conferencing station, a video game, an information kiosk, a remote sensor, a remote actuator, or any other suitable communication device.

Wireless link 28 may be any form of electromagnetic signaling not confined to a wire or cable, including energy radiated by antenna as well as visible and invisible light. As will be appreciated by one of ordinary skill in the art, wireless link 28 may be implemented by any access technology, including CDMA, TDMA, FDMA, OFDM, analog, and the like. Modulation techniques that may be used with the present invention include FSK, BPSK, QPSK, m-ary QAM, FM, AM, and the like. Further, the invention does not depend on modulation frequency or on the use of FDD or TDD. In a preferred embodiment, the access technology, frequency, and modulation method for establishing wireless link 28 are based, in part, on local geography, local regulations, noise and distortion sources, other operating wireless systems, cost, or any other suitable parameter. Subscriber unit 26 and access point 22 may establish wireless link 28 using a plurality of combinations of access technology, frequency, and modulation techniques.

Information transmitted on links 28, 29 may represent voice, data, video, streaming audio, streaming video, or the like. Types of information include speech, facsimile, computer data, entertainment and informational audio and video, video game data, telemetry information, security information, and the like. If the information occurs as a continuous stream, subscriber unit 26 breaks the information into packets prior to packet transmission and reassembles the information stream from packets after packet reception. Any type of information that exists in packets or that may be packetized can be used with the present invention.

In an embodiment of the present invention, subscriber unit 26 may be implemented as part of terminal network controller 30 accepting inputs from and providing outputs to information sources including voice equipment 32, computing equipment 34, telemetry equipment 36, video equipment 38, or any other suitable communication equipment. Inputs to terminal network controller 30 may include serial data, parallel data, ISDN, standard telephone, xDSL, SR 1394, coaxial cable, twisted pair cable, optical fiber, or any other suitable communication protocol, method, or medium.

In an embodiment of the present invention, a quality error bit rate is established for each subscriber unit 26. This quality error bit rate may be based on the location of subscriber unit 26 within communication system 20, the class of service assigned to subscriber unit 26, the grade of service assigned to subscriber unit 26, the data or transmission rate of service assigned to subscriber unit 26, or any other suitable parameter. The quality error bit rate may be modified while subscriber unit 26 is within communication system 20 to reflect changing conditions such as noise, demand, connectivity, or any other suitable parameter. Applications providing services to subscriber unit 26 may adjust these services based on the quality error bit rate. For example, an application providing streaming audio and video may reduce the frame update rate as noise increases, guaranteeing successful transmission at a lower information rate. The information rate may be further reduced to provide only still pictures and audio if conditions continue to worsen. The information rate may also be automatically changed if subscriber unit 26 moves between coverage areas 24 with differing transmission capabilities or loads.

Control of the information rate may be achieved by having subscriber unit 26 monitor a signaling channel transmitted by access point 22 for each coverage area 24. This signaling channel informs subscriber unit 26 when to transmit information, how much information to transmit, the information transmission rate, and the like. The signaling channel may be controlled by a central supervisor, described below.

In an embodiment of the present invention, bandwidth on communication link 28 is only consumed when packets containing information are transmitted. For example, each subscriber unit 26 surrenders bandwidth on communication link 28 when not sending or receiving an information packet. Packets to be transmitted are queued based on order of arrival, priority, a combination of arrival order and priority, or the like. Subscriber unit 26 monitors a signaling channel transmitted by access point 22 for each coverage area 24. Subscriber unit 26 only consumes bandwidth when instructed to transmit by the signaling channel or when receiving packets.

Each access point 22 communicates with at least one distribution point 40. Distribution point 40 contains both routing and switching functionality. Access point 22 may be in contact with one or more radio access distribution points 40 over radio link 42, may be wired or cabled to distribution point 40 through wireline link 44, or may be packaged with distribution point 40. Access point 22 may also be transformed into distribution point 40, permitting access point 22 to route traffic that neither originated nor terminated with any of its serviced subscriber units 26. Distribution point 40 is in communication with at least one additional distribution point 40, the collection of interconnected distribution points forming a network of distribution points, shown generally by 41. Two distribution points may be connected by radio link 46 or wireline link 48.

Distribution points 40 may route packets within distribution point network 41 under a variety of protocols such as ATM, TCP/IP, 802.x, or the like. In a preferred embodiment, distribution point 40 includes an ATM/IP switch. Distribution point 40 then operates at both the IP routing and ATM switching layers or, in terms of the Open Systems Interconnection (OSI) standard, at both the network layer and the data link layer.

The IP layer operates with a link-state protocol such as the open shortest path first (OSPF), quality OSPF (Q-OSPF), or internal gateway routing protocol (IGRP) and its derivatives. The IP layer operates as a single autonomous system (AS) within the IP frame of reference. Each system 20 will be allocated a unique and unambiguous AS number for system management. IP addresses for system 20 will use a private IP address space that cannot be routed within public systems such as the Internet. Subscriber units 26 within system 20 may be permitted access to the private IP address space or may be excluded from the private IP address space. When private IP address space is used for subscriber units 26, a network address translator (NAT) within system 20 allows subscriber units 26 access to the Internet. The ATM layer operates with the private network node interface (PNNI) routing protocol. ATM end system addresses (AESAs), managed by the service provider for system 20, are used by distribution point network 41.

The ATM network carries voice traffic and may carry data. Through PNNI, the ATM/IP switch participates in switched or signaled virtual connections (SVCs). When subscriber unit 26 within system 20 requires voice connectivity, it signals such a request, which is serviced by distribution point 40 receiving that request. The IP network coresiding with the ATM network is used for delay insensitive data applications required by subscriber units 26. The IP network is also used for all network management, including management of ATM/IP switches, subscriber units 26, gear associated with distribution points 40, and any other suitable network component. This includes functions such as alarming, monitoring, recovery systems, and the like. While described in the context of a wireless network application, it is readily apparent that ATM/IP routing as described herein may be applied to wireline and mixed wireline-wireless systems as well.

Each distribution point 40 receives an information packet from either another distribution point 40, from subscriber unit 26 in communication with distribution point 40 through access point 22, or from an external communication system. If distribution point 40 determines the information packet is destined for subscriber unit 26 within coverage area 24 of access point 22 in communication with distribution point 40, distribution point 40 forwards the packet to access point 22 forming coverage area 24 containing destination subscriber unit 26. If distribution point 40 determines the information packet is destined for subscriber unit 26 in coverage area 24 formed by access point 22 in communication with a different distribution point 40, distribution point 40 forwards the packet to one of distribution points 40 in communication with distribution point 40. Hence, no central MSC is required for routing. Distributed routing removes delays caused by central switching, increases the robustness of the communication system 20, increases network efficiency, and permits simplified expansion or reduction of communication system 20 by automatically adding or removing distribution points 40.

A third option is that distribution point 40 determines that the information packet is destined for a destination not part of communication system 20. Special distribution points, such as gateway 50, provide a bridge to additional communication systems 52 including wireless and wireline telecommunication systems, video distribution systems, computer network systems such as the Internet, packet systems, frame systems, ATM systems, IP systems, private networks, and any other suitable communication or information system. If distribution point 40 determines the information packet is destined for delivery outside of communication system 20, distribution point 40 forwards the packet to one of distribution points 40 in communication with gateway 50.

In an embodiment of the present invention, communication system 20 includes communication system interface device 54 operative to format information contained in the information packet to pass through telecommunication system 52. Communication system interface device 54 may be incorporated into gateway 50 or may be a separate component of communication system 20. Distribution point 40 receives at least one information packet from the telecommunication system interface device 54 and determines if the at least one information packet destination is to subscriber unit 26 within coverage area 24 of access point 22 in communication with distribution point 40. Distribution point 40 forwards the at least one information packet to access point 22 defining coverage area 24 containing subscriber unit 26 if the information packet destination is to subscriber unit 26 within coverage area 24 of access point 22 in communication with distribution point 40 and forwards the at least one information packet to one of the additional distribution points 40 in communication with distribution point 40 otherwise.

Each distribution point 40 communicates with supervisor 56. Supervisor 56 tracks the locations of subscriber units 26 within communication system 20, identifying with which distribution point 40 each subscriber unit 26 is currently communicating. Supervisor 56 manages transmission priorities based on parameters including load, information type, service requests, location, grade of service, information transfer rates, or any other suitable parameter. Supervisor 56 may also serve as a collection point for alarms and performance measuring of communication system 20. Supervisor 56 may further include or interface with billing and authentication services.

In an embodiment of the present invention, supervisor 56 also assigns an address to each distribution point 40 as distribution point 40 is added to communication system 20. Supervisor 56 provides each distribution point 40 with a logical address and a listing indicating to which additional distribution point 40 in communication with distribution point 40 information packets should be forwarded for each possible destination distribution point 40. The listing may be based on maintaining a minimum quality of service in the path through distribution point network 41 to the destination distribution point 40. Supervisor 56 periodically assesses the performance of network 41 by sending test messages. Reports may also be generated by distribution points 40 attempting to communicate with target addresses.

Supervisor 56 is shown in FIG. 1 as a separate component individually connected to each distribution point 40. Alternatively, communication between supervisor 56 and distribution points 40 may be through radio links 46 and wireline links 48. Supervisor 56 may be one or more separate components of communication system 20, may be incorporated into one of distribution points 40, or may be distributed amongst multiple distribution points 40.

In an embodiment of the present invention, a distribution point may be automatically added to or removed from distribution point network 41. When new distribution point 40 is first inserted into communication system 20, new distribution point 40 transmits a signature signal. Existing distribution points 40 within range of new distribution point 40 receive the signal and report it to supervisor 56. Supervisor 56 then determines if new distribution point 40 will be added to network 41. If so, supervisor 56 assigns new distribution point 40 a routing address and informs network 41 as needed. Each existing distribution point 40 in distribution point network 41 is provided with an indication as to which distribution point 40 in communication with existing distribution point 40 each information packet having a destination address specifying the new distribution point 40 is to be forwarded. If a distribution point 40 is removed from network 41, remaining distribution points 41 report the absence of removed distribution point 40 to supervisor 56. Supervisor 56 then informs network 41 as needed.

In an embodiment of the present invention, each subscriber unit 26 is autonomously registered with communication system 20 when subscriber unit 26 first enters coverage area 24 within communication system 20. Each subscriber unit 26 maintains registration as subscriber unit 26 moves from one coverage area 24 into another coverage area 24 within communication system 20 and is autonomously deregistered when subscriber unit 26 leaves communication system 20. To accomplish automatic registration and deregistration of subscriber units 26, each access point 22 periodically reports the status of subscriber units 26 within any controlled coverage area 24 to supervisor 56 performing registration and authentication. Each access point 22 communicates with subscriber units 26 to determine status. When a subscriber unit 26 voluntarily enters or leaves coverage area 24, such as by powering up or down, subscriber unit 26 transmits a particular signal to access point 22. Information is also received from subscriber unit 26 in response to periodic queries from network 20. Access point 22 may determine the absence of subscriber unit 26 from coverage area 24 if no communication is received after a particular time interval. Algorithms for registering and deregistering subscriber units 26 may be based on various factors including quality of service, traffic, location, service type, network topology, and the like.

Figure 2:
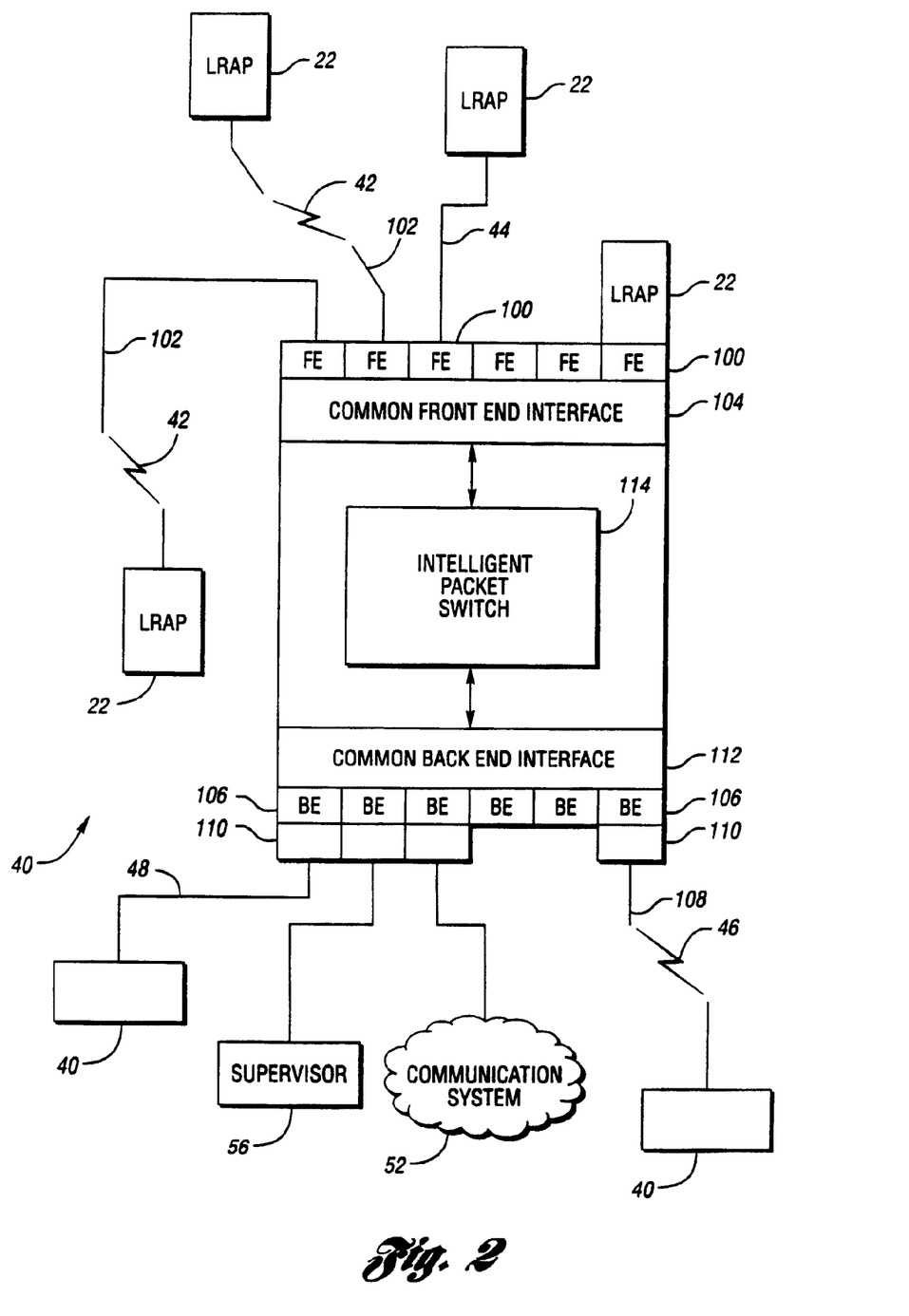
FIG. 2 is a block diagram of a distribution point according to an embodiment of the present invention.

Referring now to FIG. 2, a block diagram of a distribution point according to an embodiment of the present invention is shown. Distribution point 40 includes one or more front end communication interfaces 100, each front end interface communicating with one access point 22. In one configuration, access point 22 is packaged with distribution point 40. Front end interface 100 may provide a plug-in port for receiving access point 22. In another configuration, front end interface 100 connects to antenna 102 for establishing radio link 42 with access point 22. In a further configuration, front end interface 100 accepts wireline link 44 connecting distribution point 40 with access point 22. Front end interface 100 operates using a standard packet switching protocol such as, for example, ATM25. Each front end communication interface 100 passes information packets through common front end switch interface 104 operating under a packet protocol such as ATM, TCP/IP, 802.x, or the like.

Distribution point 40 also includes back end communication interfaces 106 for connecting distribution point 40 with additional distribution points 40, with supervisor 56, and, if distribution point 40 is a gateway 50, with telecommunication systems, private network systems, video distribution systems, the Internet, or the like. This may be typically referred to as back haul communication. In one configuration of the present invention, back end interface 106 connects to antenna 108 for establishing radio link 46 with another distribution point 40. In another configuration, back end interface 104 accepts wireline link 44 connecting distribution point 40 with another distribution point 40. In a preferred embodiment, back end interface 106 accepts modules 110 for interfacing through a variety of protocols and media such as ATM25, DS1, DS3, OC3, 1000Base-T, 100Base-T, and the like. Each back end communication interface 106 passes information packets through common back end switch interface 112 operating under a packet protocol such as ATM, TCP/IP, or the like. In a preferred embodiment, distribution point 40 dynamically allocates bandwidth when the information packet is forwarded to one of the additional distribution points 40 in communication with distribution point 40.

Intelligent packet switch 114 received information packets through common front end switch interface 104 and common back end switch interface 112 and routes the packets between front end interfaces 100 and back end communication interfaces 106. Switch 114 may be a packet switching device as is known in the art such as an ATM switch, an IP switch, a TDM switch, a switch working under the 802.11 specification, or any other suitable alternative or combination having the required switching functionality. In an embodiment of the present invention, switch 114 includes an ATM portion for routing voice, video and data, and an IP portion for real-time dynamic data routing and non-real time data routing as well as administration, management, and network topology control.

In an embodiment of the present invention, distribution point 40 is enclosed in an environmentally sealed package. This permits distribution point 40 to be mounted outside, such as on a pole or the side of a building. In keeping with the invention, however, distribution point 40 need not be outside so long as it can communicate with access points 22, additional distribution points 40, supervisor 56, and any other suitable network component.

Figure 3:
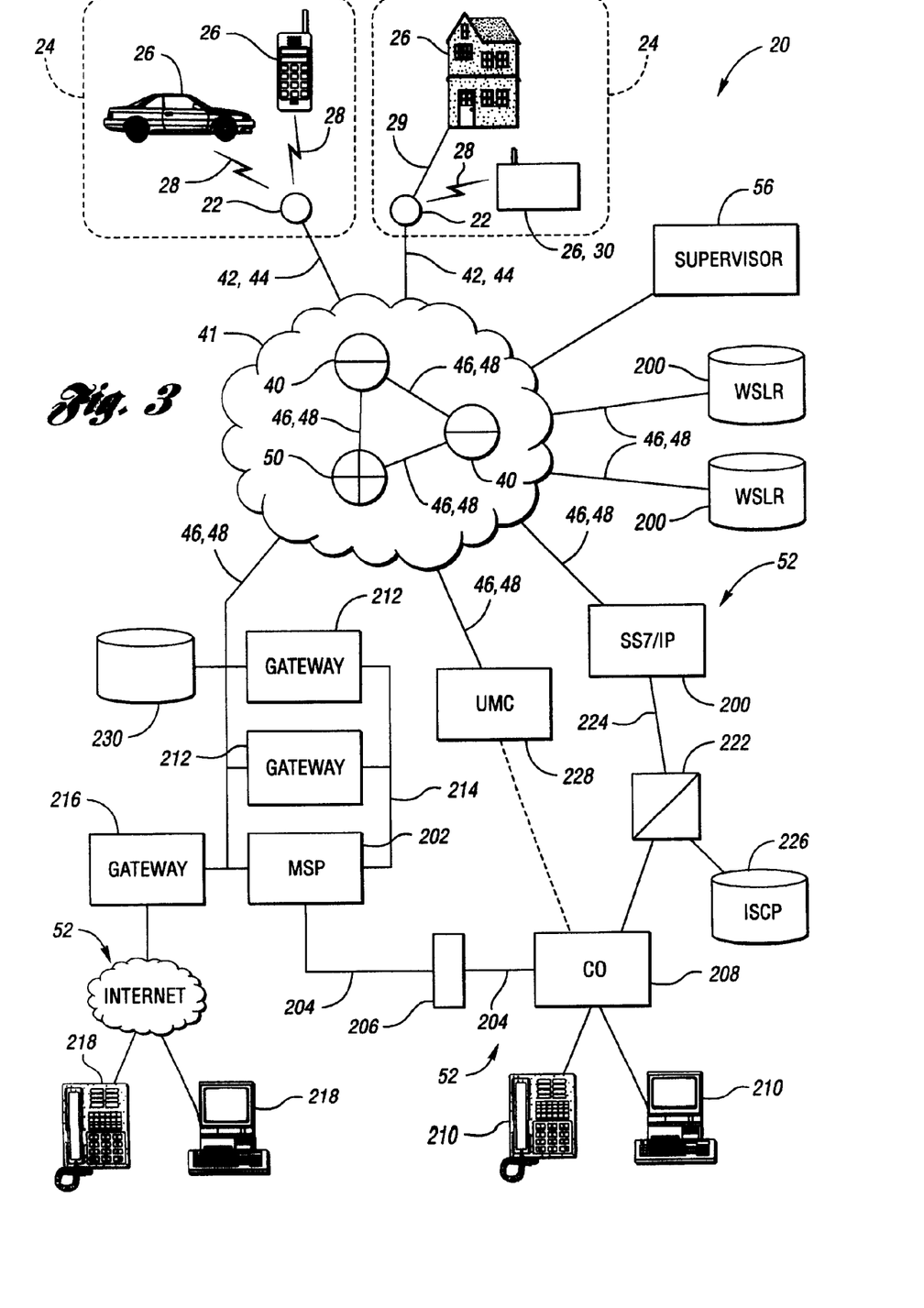
FIG. 3 is a schematic drawing illustrating an implementation of a communication system according to an embodiment of the present invention.

Referring now to FIG. 3, a schematic drawing illustrating an implementation of a communication system according to an embodiment of the present invention is shown. This implementation provides an example including interfaces between communication system 20 and a variety of external communication systems 52.

Communication system 20 includes wireless service location registers (WSLRs) 200 providing common subscriber and service databases. Each WSLR 200 communicates with at least one distribution point 40 and one additional communication system 52. Connections between WSLRs 200 and communication systems 52 are not shown in FIG. 3 for clarity. Each WSLR 200 provisions requested services from additional communication system 52. For example, WSLR 200 may provide centralized mobility and location management. Supervisor 56 determines which WSLR 200 will provision services based on the distribution point 40 through which subscriber unit 26 requesting services is currently communicating. A device that may serve as WSLR 200 is described in U.S. Pat. No. 5,974,331 titled "Method And System For Dynamically Assigning Features And Users To Wireline Interfaces," to Cook et al., which is herein incorporated by reference. Call agents may also function as WSLR-like devices to map or integrate additional communication systems with system 20.

Communication system 20 may also include multi-service platform (MSP) 202. MSP 202 provides access to wireline telephone systems (PSTN). This may be accomplished through GR-303 compliant connection 204. Signaling point of interface (SPOI) 206 serves as the demarcation point between communication system 20 and external communication system 52. In the example shown, GR-303 connection 204 connects wireline provider 208, serving wired customers 210, with communication system 20. MSP 202 may integrate both PSTN and IP networks as well as provide enhanced circuit/packet switch services.

At least one gateway 212 supports MSP 202. Communication system 20 may include, for example, voice-over-ATM (VoATM) to GR-303 gateways and voice over IP (VoIP) to GR-303 gateways. Gateway 212 serves as a protocol agent, converting information packets to a format acceptable to additional communication system 52. A determination as to which gateway 212 will process an information packet may be based on information contained within the information packet. Gateways 212 may be connected to MSP 202 by GR-303 compliant connection 214.

Communication system 20 may also include gateway 216 connecting communication system 20 with external data network 52 such as the Internet or a private data network interconnecting network users 218. Gateway 216 may, for example, convert between various packet-based standards such as H.323 and SIP.

Communication system 20 may also include gateway 220 interfacing communication system 20 with external SS7 network 52 represented by signal transfer point (STP) 222. Gateway 220 communicates with STP 222 through ISUP compliant connection 224 which permits setting up and taking down trunk calls, calling party information services, call status, and any other suitable network function, by passing signaling information through SS7 network 52 to wireline provider 208 under the control of integrated services control point (ISCP) 226.

Communication system 20 may also include unified message center (UMC) 228. Unified messages, also known as integrated messages, permit messages from a variety of sources such as telephone, email, fax, reports, compound documents, or any other suitable information or communication device, to be summarized and presented on a single medium, such as a personal computer. Messages may even be translated from one media type to another. UMC 228 supports unified message applications within communication system 20. In an embodiment, UMC 228 communicates with wireline provider 208, permitting greater integration, flexibility and access to messages.

Connection controller 230 controls access to gateways 50, 202, 212, 216, 220, or any other suitable interface. For example, connection controller 230 may manage voice over ATM to GR-303 access, voice over IP to GR-303 access, H.323/SIP to Internet remote access, SS7 to IP access, and the like. Connection controller 230 may also support information rate adaptation including open application processor interfaces and robust application development platforms.

Figure 4:
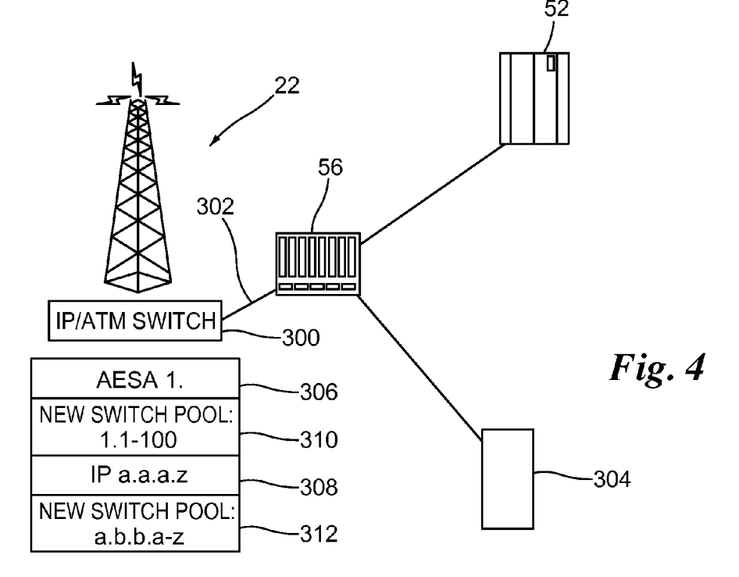
FIG. 4 is a schematic drawing illustrating an initial state for a communication system according to an embodiment of the present invention.
Figure 5:
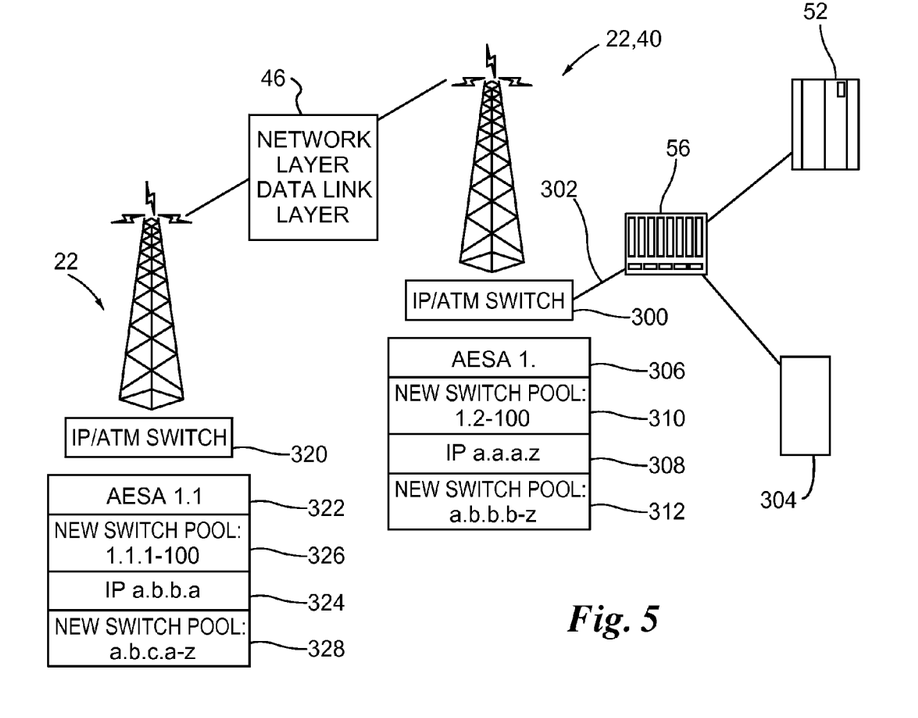
FIG. 5 is a schematic drawing illustrating the addition of a second access point to the communication system of FIG. 4 according to an embodiment of the present invention.
Figure 6:
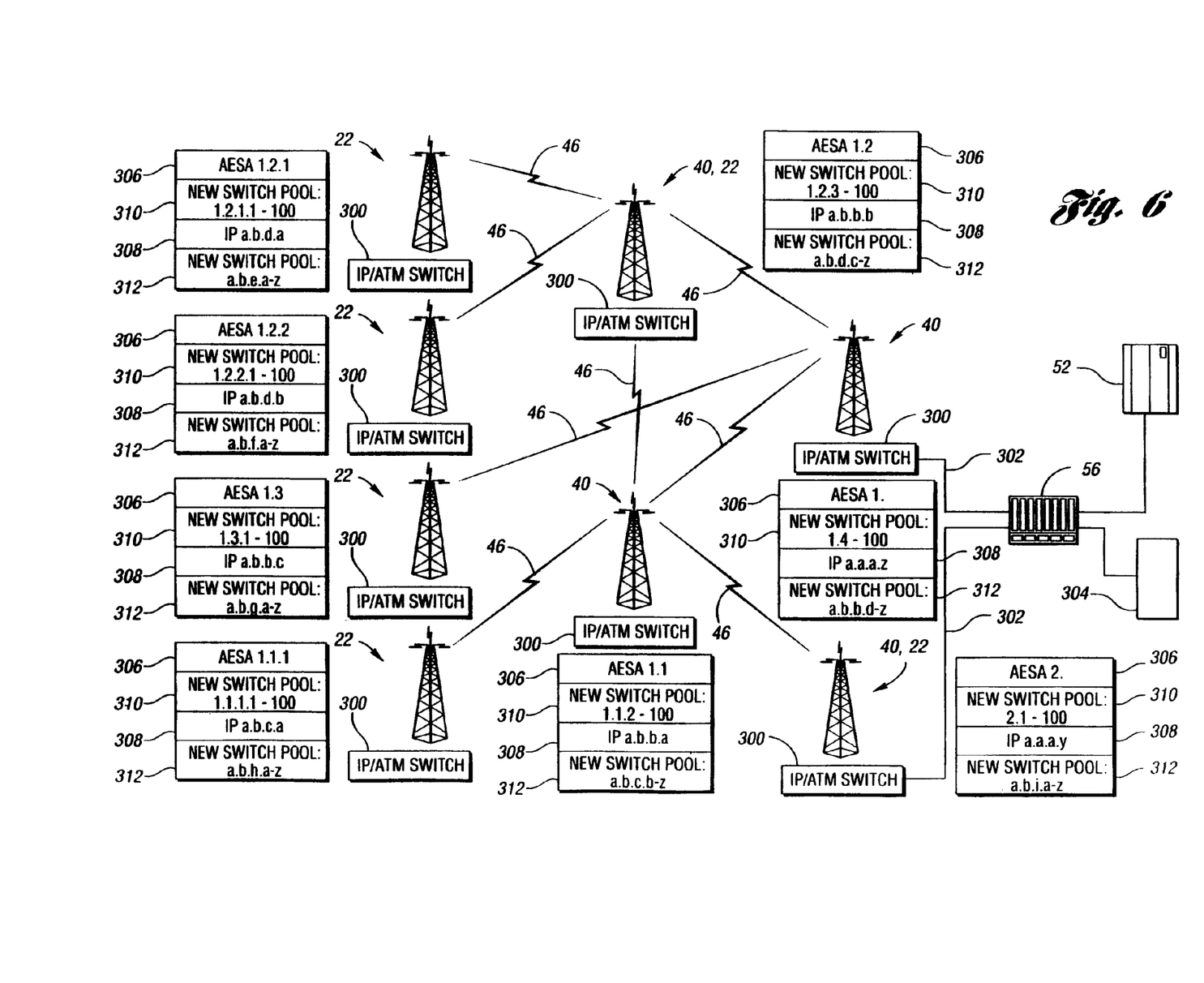
FIG. 6 is a schematic drawing illustrating a hierarchical routing system using ATM/IP switches according to an embodiment of the present invention.

Referring now to FIGS. 4-6, drawings illustrating dynamic growth of a distribution point network according to an embodiment of the present invention are shown. An initial configuration for system 20 is shown in FIG. 4. ATM/IP switch 300 is in communication with supervisor 56 through ATM virtual connection 302. In this simple configuration, ATM/IP switch 300 may be functioning as access point 22.

ATM/IP switch 300 may obtain an IP address and an ATM address either manually or automatically.

ATM/IP switch 300 automatically requests addresses by first broadcasting an ATM request in an IP packet over virtual connection (VC) 302. Supervisor 56 forwards this request to address server 304. Address server 304 responds by allocating unique AESA 306 to the address assignment client in ATM/IP switch 300, which updates the ATM layer with new address 306. The address assignment client in ATM/IP switch 300 next requests from address server 304 an IP address, again using IP as the transport service over pre-existing ATM VC 302. Address server 304 forwards IP address 308 to ATM/IP switch 300. ATM/IP switch 300 then requests address pools for ATM and IP. Address server 304 responds by supplying AESA pool 310 and IP address pool 312. Pools of addresses 310, 312 are used by switch 300 when functioning as distribution point 40 in support of other distribution points 40 and access points 22.

Referring now to FIG. 5, a drawing illustrating the addition of a second access point is shown. Access point 22 has the capability to function as a distribution point 40. As new access points 22 are subtended from an existing access point 22, existing access point 22 becomes a distribution point 40. Each distribution point 40 continues to communicate with its initially connected distribution point 40 and with other distribution points 40 as they are provisioned. As new links 46, 48 between distribution points are created, distribution points 40 form peer relationships at both the ATM layer and the IP layer. Distribution points 40 are always peers at the IP and ATM layer, while access points 22 are clients of distribution points 40. As such, each ATM/IP switch 300 functions as a server when operating as distribution point 40 and as a client when operating as access point 22.

When new ATM/IP switch 320 is instantiated as access point 22, it will automatically request an ATM address in an IP packet address assignment request. This IP packet will be sent in an ATM frame over radio link 46 to IP/ATM switch 300 functioning as distribution point 40 using a pre-existing ATM VC. IP/ATM switch 300 will allocate unique ATM address 322 from AESA pool 310 and unique IP address 324 from IP address pool 312. ATM/IP switch 320 then sends a directed request to address server 304 and receives its own AESA pool 326 and IP address pool 328.

Referring now to FIG. 6, a hierarchical routing network is shown. Address server 304 assigns AESA pool 310 and IP address pool 312 as each ATM/IP switch 300 is added. By handling all requests for address pools 310, 312, address server 304 maintains a hierarchy of addresses for both ATM and IP layers. Address server 304 constructs routing tables for each ATM/IP switch 300 indicating to which directly connected ATM/IP switch 300 each incoming packet should be routed if the packet is not destined to subscriber unit 26 serviced by that ATM/IP switch 300. Thus, routing tables are cohesive, reflecting the view of communication system 20 seen by each ATM/IP switch 300. Address server 304 also constructs forward equivalency class (FEC) tables permitting ATM/IP switch 300 to route packages based on package contents. FECs can be seen as either the virtual path identifier (VPI) portion of the ATM VPI/VCI or as the entire VPI/VCI, and are enabled by the routing protocols at the IP and PNNI layers.

New routing elements are dynamically added to a network of routing elements by establishing a connection between the new routing element and an existing routing element in the network of routing elements. At least one address is assigned to the new routing element, each assigned address coming from a pool of addresses maintained at the existing routing element. At least one pool of addresses is issued to the new routing element. The one or more pool of addresses permitting the new routing element to dynamically add yet another new routing element to the network of routing elements.

In an embodiment of the present invention, a method of dynamically adding a routing element to a distributed communications includes establishing an ATM virtual connection with an existing distribution point already part of the communications network. An ATM end user address is requested from the existing distribution point. An ATM end user address is obtained from the existing distribution point, the ATM end user address allocated from a pool of ATM end user addresses in the existing distribution point. An IP address is requested from the existing distribution point. An IP address is obtained from the existing distribution point, the IP address allocated from a pool of IP addresses in the existing distribution point. Preferably, a pool of ATM end user addresses is requested and received from an address server. A pool of IP addresses is requested and received from the address server. An ATM end user address from the pool of ATM end user addresses and an IP address from the pool of IP addresses may be assigned to a new routing element requesting to be added to the communications network.

In an embodiment of the present invention, when a new distribution point is added to a network of distribution points, a connection is established between the new distribution point and at least one existing distribution point in the network of distribution points. A peer-to-peer relationship is formed at the OSI network layer between the new distribution point and the at least one existing distribution point. A peer-to-peer relationship is formed at the OSI data link layer between the new distribution point and the at least one existing distribution point.

In an embodiment of the present invention, when an access point is added to a network of distribution points, a connection is established between the access point and at least one existing distribution point in the network of distribution points. A client-server relationship is formed at the OSI network layer between the access point client and the at least one existing distribution point server. A client-server relationship is formed at the OSI data link layer between the access point and the at least one existing distribution point server.

In an embodiment of the present invention, when an ATM/IP switch 300 is removed from communication system 20, all of the addresses 306, 308 and address pools 310, 312 associated with the removed switch 300 are released. Addresses 306, 308 and address pools 310, 312 may be instantiated at distribution point 40 which originally supplied removed switch 300 with addresses 306, 308, may be sent to supervisor 56, or may be split with addresses 306, 308 returning to distribution point 40 and address pools 310, 312 returning to supervisor 56.

When subscriber unit 26 first enters communication system 20, it is detected and serviced by access point 22. Subscriber unit 26 is provided with one or more addresses, each address routable within at least the local hierarchy of ATM/IP switches 300. If subscriber unit 26 enters the range of a new access point 22, new access point 22 sends out a flooding FEC routing update for the ATM address of subscriber unit 26. Previously servicing access point 22 removes subscriber unit 26 from its own FEC upon receiving the FEC update. Any subsequent ATM packets received by previously servicing access point 22 are discarded.

When subscriber unit 26 changes access points 22, the IP routing portion of system 20 moves the IP address of subscriber unit 26 from one FEC class to another. Any IP packets remain untouched, with only a label or equivalence changed.

In one embodiment, the label is the VPI portion of the VC. In another embodiment, multiprotocol label switching (MPLS) is used to provide an additional label. In either case, the IP address and virtual connection identifier (VCI) are retained.

Figure 7:
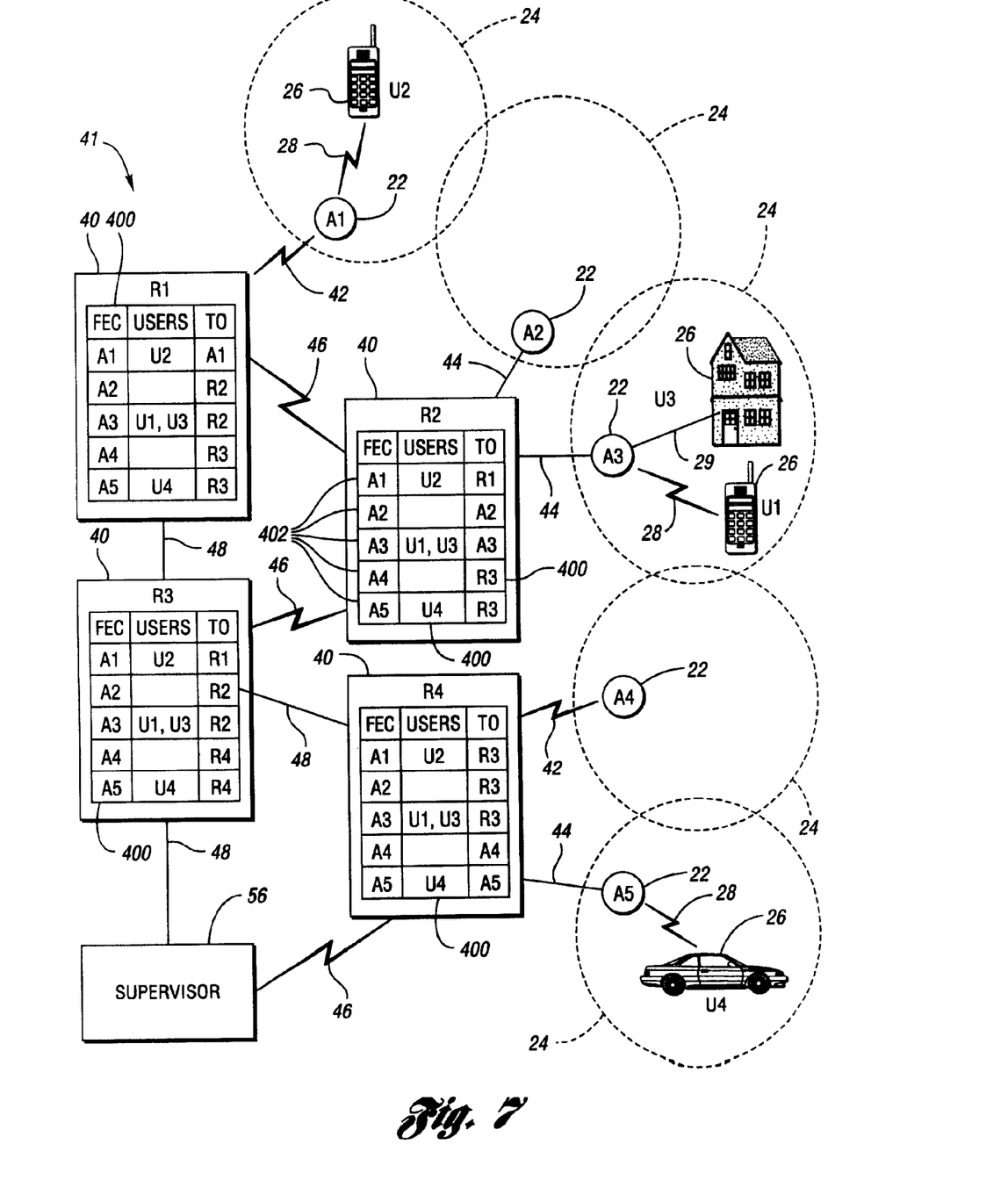
FIG. 7 is a schematic drawing illustrating a network of distribution points routing packets based on forward equivalency classes.

Referring now to FIG. 7, a schematic drawing illustrating a network of distribution points routing packets based on forwarding equivalency classes is shown. Each distribution point contains an FEC table 400 used to route packets received from and destined to subscriber units 26. Forwarding equivalency class table 400 contains one entry for each forwarding equivalency class 402. In the embodiment shown, there is one FEC 402 corresponding to each access point 22. When subscriber unit 26 is first detected by access point 22, the address for subscriber unit 22 is placed in the equivalency class 402 corresponding to the detecting access point 22. The address is typically an IP address. This may be done by broadcasting from detecting access point 22 or, preferably, is done by supervisor 56 after supervisor 56 receives a message indicating subscriber unit 26 has been detected by access point 22.

FEC table 400 in each distribution point 40 contains the next destination for each FEC 402. Typically, destinations are other distribution points 40, access points 22 serviced by distribution point 40, gateways 50, and other suitable points for routing, switching, servicing, distributing, and the like. When a packet destined for subscriber unit 26 is received by distribution point 40, distribution point 40 determines to which FEC subscriber unit 26 is assigned, determines to which destination the packets in that FEC are routed, and forwards the packet to the determined destination.

Figure 8:
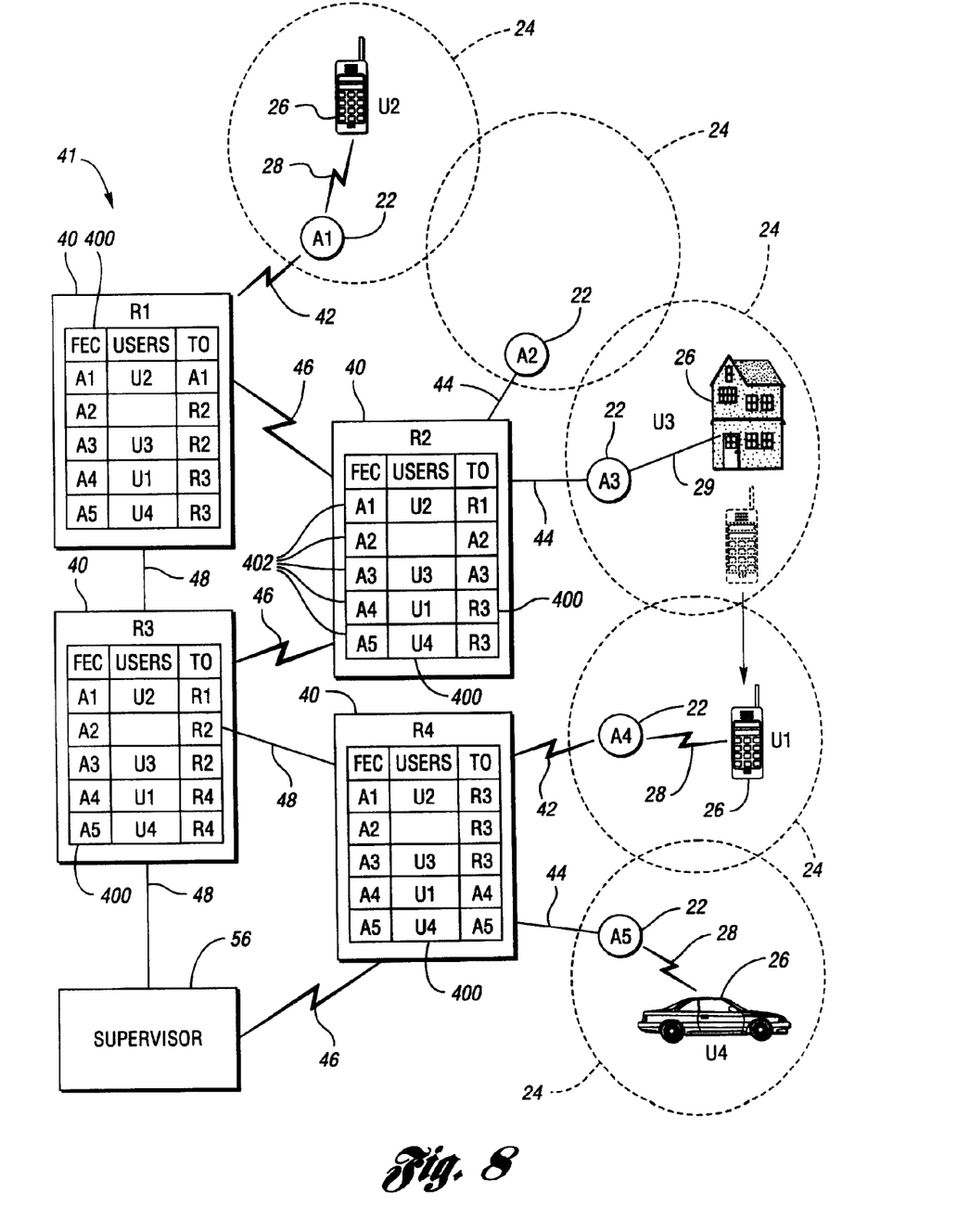
FIG. 8 is a schematic drawing illustrating forward equivalency class updating to track a moving subscriber unit.

Referring now to FIG. 8, a schematic drawing illustrating forwarding equivalency class updating to track a moving subscriber unit is shown. If subscriber unit 26 is mobile or portable, as indicated by U1 in FIG. 8, subscriber unit 26 may move out of coverage area 24 for one access point 22 and into coverage area 24 for a new access point 22. The address for subscriber unit 26 is then moved from FEC 402 of original access point 22 into FEC 402 for new access point 22. In an embodiment, when original access point 22 is no longer in communication with subscriber unit 26, original access point 22 broadcasts a message to distribution points 40 and supervisor 56. If original access point 22 subsequently receives any packets for subscriber unit 26, original access point forwards these packets back into distribution point network 41. If the packets are sequentially indicated, such as IP packets, correct order will be established by subscriber unit 26 when packets are received.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of adding a new distribution point to a network of distribution points, the method comprising:
   maintaining, at an existing distribution point, a pool of IP addresses and a pool of ATM addresses;
   establishing a connection between the new distribution point and at least the existing distribution point in the network of distribution points, wherein the new distribution point comprises an IP/ATM switch;
   assigning to the new distribution point an IP address from the pool of IP addresses and an ATM address from the pool of ATM addresses;
   receiving, at the new distribution point, a new pool of IP addresses and a new pool of ATM addresses to assign to clients of the new distribution point;
   forming a peer-to-peer relationship at an OSI network layer between the new distribution point and at least the existing distribution point; and
   forming a peer-to-peer relationship at an OSI data link layer between the new distribution point and at least the existing distribution point.

2. A method of adding a new distribution point as in claim 1 wherein the peer-to-peer relationship at the network layer includes governing exchanges of IP packets carrying data and control information and wherein the peer-to-peer relationship at the data link layer includes governing exchanges of ATM packets carrying voice information.

3. The method of claim 1 further comprising,
   providing the new distribution point with a listing indicating to which of the at least one existing distribution point information packets should be forwarded, the listing being based on minimum quality of service.

4. The method of claim 1 further comprising,
   transmitting a signal from the new distribution point when the new distribution point is inserted into the network of distribution points; and
   receiving the signal at the at least one existing distribution points.

5. A method of adding an access point to a network of distribution points, the method comprising:
   maintaining, at an existing distribution point, a pool of IP addresses and a pool of ATM addresses;
   establishing a connection between a first access point and at least the existing distribution point in the network of distribution points, wherein the existing distribution point comprises an IP/ATM switch;
   establishing a connection between a new access point and the first access point;
   transforming the first access point into a new distribution point;
   assigning to the new distribution point an IP address from the pool of IP addresses and an ATM address from the pool of ATM addresses;
   receiving, at the new distribution point, a new pool of IP addresses and a new pool of ATM addresses to assign to clients of the new distribution point;
   forming a client-server relationship at an OSI network layer between the new access point comprising the access point client and the new distribution point comprising the new distribution point server; and
   forming a client-server relationship at an OSI data link layer between the access point client and the new distribution point server.

6. A method of adding an access point as in claim 5 wherein the client-server relationship at the network layer includes governing exchanges of IP packets carrying data and control information and wherein the client-server relationship at the data link layer includes governing exchanges of ATM packets carrying voice information.

7. The method of claim 5 further comprising, adding a second access point to the network of distribution points wherein,
   the second access point is subtended from the access point client; and
   the access point client becomes a distribution point.

8. The method of claim 7 wherein, the access point client functions as a server when operating as a distribution point and as a client when operating as an access point.

9. The method of claim 7 wherein, the second access point automatically requests an ATM address in an IP packet address assignment request from the access point client.

10. A distributed communication system comprising:
- a network of distribution points for routing information packets based on destination addresses, the network of distribution points comprising an existing distribution point that maintains a pool of IP addresses and a pool of ATM addresses; and
- a new distribution point to be added to the network of distribution points, the new distribution point comprising an IP/ATM switch and being operative to
  - (a) establish a connection with at least the existing distribution point in the network of distribution points,
  - (b) form a peer-to-peer relationship at an OSI network layer with at least the existing distribution point, and
  - (c) form a peer-to-peer relationship at an OSI data link layer with at least the existing distribution point;
- wherein the existing distribution point is operative to assign to the new distribution point an IP address from the pool of IP addresses and an ATM address from the pool of ATM addresses; and
- wherein the new distribution point is operative to receive a new pool of IP addresses and a new pool of ATM addresses to assign to clients of the new distribution point.

11. A distributed communication system as in claim 10 wherein the peer-to-peer relationship at the network layer governs exchanges of IP packets carrying data and control information and wherein the peer-to-peer relationship at the data link layer governs exchanges of ATM packets carrying voice information.

12. The system of claim 10 wherein, the new distribution point is further operative to,
- be removed from the network of distribution points; and
- release one or more addresses and address pools associated with the new distribution point.

13. A distributed communication system comprising:
- a network of distribution points for routing information packets based on destination addresses, the network of distribution points comprising an existing distribution point that maintains a pool of IP addresses and a pool of ATM addresses;
- an existing access point operative to
  - (a) establish a connection with the existing distribution point;
  - (b) transform into a new distribution point when connected with a new access point; and
- a new access point to be connected to the network of distribution points, the new access point operative to
  - (a) establish a connection with at least the new distribution point in the network of distribution points, the new distribution point comprising an IP/ATM switch;
  - (b) form a client-server relationship at the data link layer with the new distribution point, the new access point functioning as a client and the new distribution point functioning as a server, and
  - (c) form a client-server relationship at the network layer with the new distribution point, the new access point functioning as a client and the new distribution point functioning as a server;
- wherein the existing distribution point is operative to assign to the new distribution point an IP address from the pool of IP addresses and an ATM address from the pool of ATM addresses; and
- wherein the new distribution point is operative to receive a new pool of IP addresses and a new pool of ATM addresses to assign to clients of the new distribution point.

14. A distributed communication system as in claim 13 wherein the client-server relationship at the network layer governs exchanges of IP packets carrying data and control information and wherein the client-server relationship at the data link layer governs exchanges of ATM packets carrying voice information.

* * * * *

UNITED STATES PATENT AND TRADEMARK OFFICE
CERTIFICATE OF CORRECTION

| | | |
|---|---|---|
| PATENT NO. | : 8,098,605 B2 | Page 1 of 1 |
| APPLICATION NO. | : 12/199267 | |
| DATED | : January 17, 2012 | |
| INVENTOR(S) | : Angus O. Dougherty et al. | |

It is certified that error appears in the above-identified patent and that said Letters Patent is hereby corrected as shown below:

Column 3, Line 33, delete "more than one layers." and insert --more than one layer.--, therefor.

Signed and Sealed this
Twenty-ninth Day of May, 2012

David J. Kappos
*Director of the United States Patent and Trademark Office*